US006934167B2

(12) United States Patent
Jang et al.

(10) Patent No.: US 6,934,167 B2
(45) Date of Patent: Aug. 23, 2005

(54) CONTACTLESS ELECTRICAL ENERGY TRANSMISSION SYSTEM HAVING A PRIMARY SIDE CURRENT FEEDBACK CONTROL AND SOFT-SWITCHED SECONDARY SIDE RECTIFIER

(75) Inventors: Yungtaek Jang, Cary, NC (US); Milan M. Jovanovic, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 175 days.

(21) Appl. No.: 10/426,721

(22) Filed: May 1, 2003

(65) Prior Publication Data

US 2004/0218406 A1 Nov. 4, 2004

(51) Int. Cl.$^{7}$ .............................................. H02M 3/335

(52) U.S. Cl. ............................... 363/21.02; 363/21.03; 363/97

(58) Field of Search ........................... 363/21.02, 21.03, 363/79, 89, 95, 97, 98

(56) References Cited

U.S. PATENT DOCUMENTS 4,535,399 A * 8/1985 Szepesi ....................... 363/41
6,246,599 B1 * 6/2001 Jang et al. .................. 363/132
6,301,128 B1 * 10/2001 Jang et al. .................... 363/17
6,490,176 B2 * 12/2002 Holzer et al. ................. 363/20
2004/0145342 A1 * 7/2004 Lyon .......................... 320/108

FOREIGN PATENT DOCUMENTS

EP 1220438 A2 * 7/2002 ...... H02M/07/5387

* cited by examiner

*Primary Examiner*—Adolf Berhane
(74) *Attorney, Agent, or Firm*—Venable LLP; Robert Babayi

(57) ABSTRACT

A contactless electrical energy transmission system includes a transformer having a primary winding that is coupled to a power source through a primary resonant circuit and a secondary winding that is coupled to a load through a secondary resonant circuit. The primary and secondary resonant circuits are inductively coupled to each other. A primary control circuit detects current changes through the primary resonant circuit to control the switching frequency of a controllable switching device for maintaining a substantially constant energy transfer between the primary winding and secondary winding in response to at least one of a power source voltage change and a load change. As a result, excessive circulating energy of the CEET system is minimized providing a tight regulation of the output voltage over the entire load and input voltage ranges without any feedback connection between the primary side and the secondary side.

19 Claims, 8 Drawing Sheets

CONTACTLESS ELECTRICAL ENERGY TRANSMISSION SYSTEM HAVING A PRIMARY SIDE CURRENT FEEDBACK CONTROL AND SOFT-SWITCHED SECONDARY SIDE RECTIFIER

FIELD OF THE INVENTION

Generally, the present invention relates to the field of contactless electrical energy transmission (CEET) systems, more particularly, to CEET systems that provide highly regulated power to a load.

BACKGROUND OF THE INVENTION

Contactless electrical energy transmissions are known for the convenience by which they deliver power to a load. Generally, CEET systems transfer power via an air-gap inductive coupling without there being any direct electric connection between a primary side and a secondary side. As such, in some applications, CEET systems offer distinct advantages over energy transmission systems that use wires and connectors. For example, CEET systems are preferred in hazardous applications such as mining and underwater environments due to the elimination of the sparking and the risk of electrical shocks. Other exemplary applications that use CEET systems include charging devices that safely and reliably transfer power to consumer electronic devices and medical devices.

A typical CEET system consists of a transmitter in the primary side, a transformer, and a receiver in the secondary side. Such CEET system employs a primary inverter at the transmitter and a secondary rectifier at the receiver. The inverter and rectifier are coupled to each other via the primary and secondary windings of the transformer. Since the primary winding and the secondary winding are inductively coupled through the air-gap, electric power is transferred from the primary side to the secondary side as magnetic energy obviating the need for any physical electrical interconnections.

However, power transmission via the inductive coupling of the CEET transformer has certain drawbacks in terms of low efficiency and unregulated delivery of power to the load. This is because the leakage inductance of the CEET transformer with air-separated primary and secondary windings is much larger than the leakage inductance of a conventional transformer that uses well interleaved primary and secondary windings. The CEET primary and secondary windings can store high amounts of leakage inductance energy that can cause high parasitic ringing and losses. Moreover, in CEET systems, it is very difficult to regulate power transmission mainly because there is no physical connection between the primary side and the secondary side that would provide feedback information for regulating the power transmission.

FIG. 1 shows one CEET system that achieves high efficiency by recovering the energy stored in the leakage inductance of the transformer. This system, which is more fully described in U.S. Pat. No. 6,301,128 B1, issued to Delta Electronics, Inc., the assignee of the present invention, incorporates the leakage inductance of each one of the primary and secondary sides in its power stage. The primary side includes a variable-frequency resonant inverter and the secondary side includes a controlled rectifier. An input-voltage feed forward control block controls the output frequency of the variable-frequency resonant inverter in response to source voltage variations, while a pulse width modulated (PWM) output voltage feedback control block controls the controlled rectifier output in response to load variations. Under this arrangement, the PWM output voltage feedback control block and the input-voltage feed forward control block act as independent controls for regulating the output voltage without any feedback connection between the primary and secondary sides. FIG. 2 shows a more detailed schematic block diagram of the power stage and the controllers shown in FIG. 1.

In conventional CEET systems, lack of any feedback information from the secondary side to the primary side prevents adjusting energy transfer from the primary side in response to load variations that occur on the secondary side. Thus, the maximum transferable power through the inductive coupling of the primary and secondary sides can vary under a range of light-load to high-load conditions. Such variations can create extra circulating energy and conduction losses. Moreover, for pulse width modulated control of energy transfer on the secondary side, the ratio of the duty cycle variations can be very large at high-load and light-load conditions. As a result, guaranteeing reliable operation over the entire load range requires complex circuitry for implementing a suitable feedback control.

Finally, switch $S_S$ of the controlled rectifier in FIG. 2 turns on with hand switching, i.e., when the MOSFET switch turns on when the voltage across the switch is equal to the output voltage. The hard switching is not desirable, because it increases conductive noise and energy loss in the CEET system.

Therefore, there exists a need for a simple CEET solution that provides a highly regulated power transfer between the primary and secondary sides and avoids harmful hard switching conditions.

SUMMARY OF THE INVENTION

Briefly, according to the present invention, a contactless electrical energy transmission system couples a power source to a load. The system includes a transformer having a primary winding that is coupled to the power source through a primary resonant circuit of an inverter and a secondary winding that is coupled to the load through a secondary resonant circuit of a rectifier. The primary and secondary resonant circuits are inductively coupled to each other. A primary control circuit is responsive to a current change through the primary resonant circuit to control the switching frequency of a controllable switching device for maintaining a substantially constant energy transfer between the primary winding and secondary winding in response to either one or both of a power source voltage change and a load change.

According to another aspect, a secondary control circuit generates one or more pulse width modulated control signals for controlling the amount of energy delivered to the load under varying load conditions. The pulse width modulated signals are generated in response to a voltage variation across the load and a zero current crossing through the secondary resonant circuit.

According to yet another aspect of the present invention, a secondary controllable switching circuit is responsive to one or more pulse width modulated control signals. The secondary controllable switching circuit has one or more switches that are activated at substantially zero voltage to avoid hard switching conditions.

According to some of the more detailed features of the present invention, the secondary control circuit detects a zero current crossing through the secondary resonant circuit to generate synchronized ramp signals for controlling the pulse width modulated control signals. In an exemplary embodiment, the synchronized ramp signals are 180° out of phase from each other.

DETAILED DESCRIPTION OF THE PREFERRED EMBODIMENTS

Figure 1:
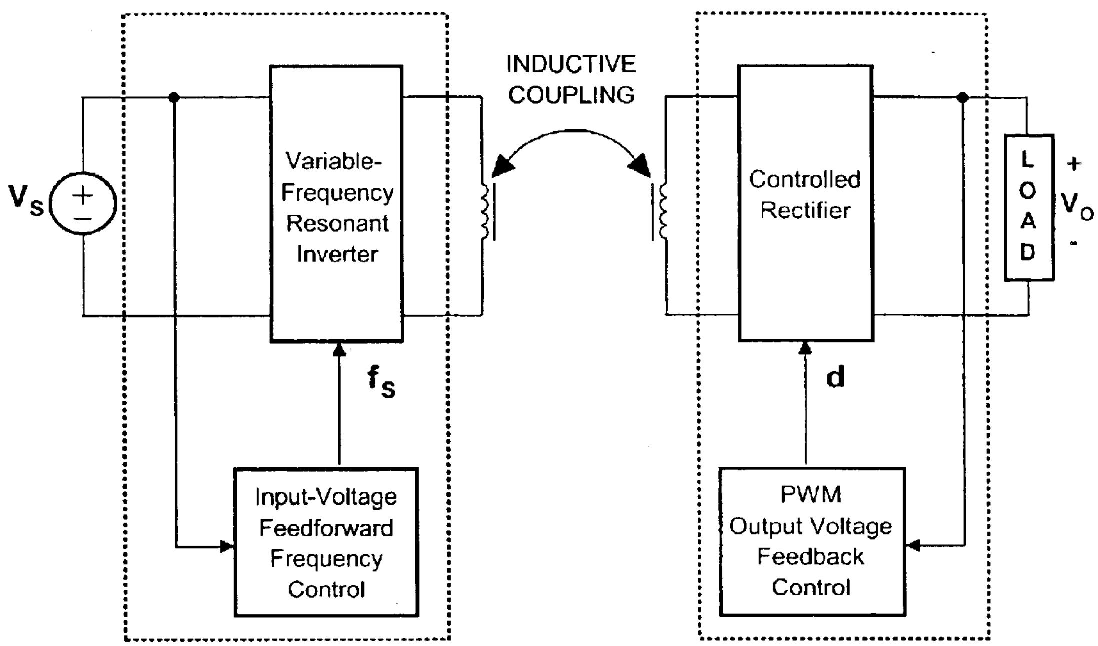
FIG. 1 shows a block diagram of a known CEET system.
Figure 2:
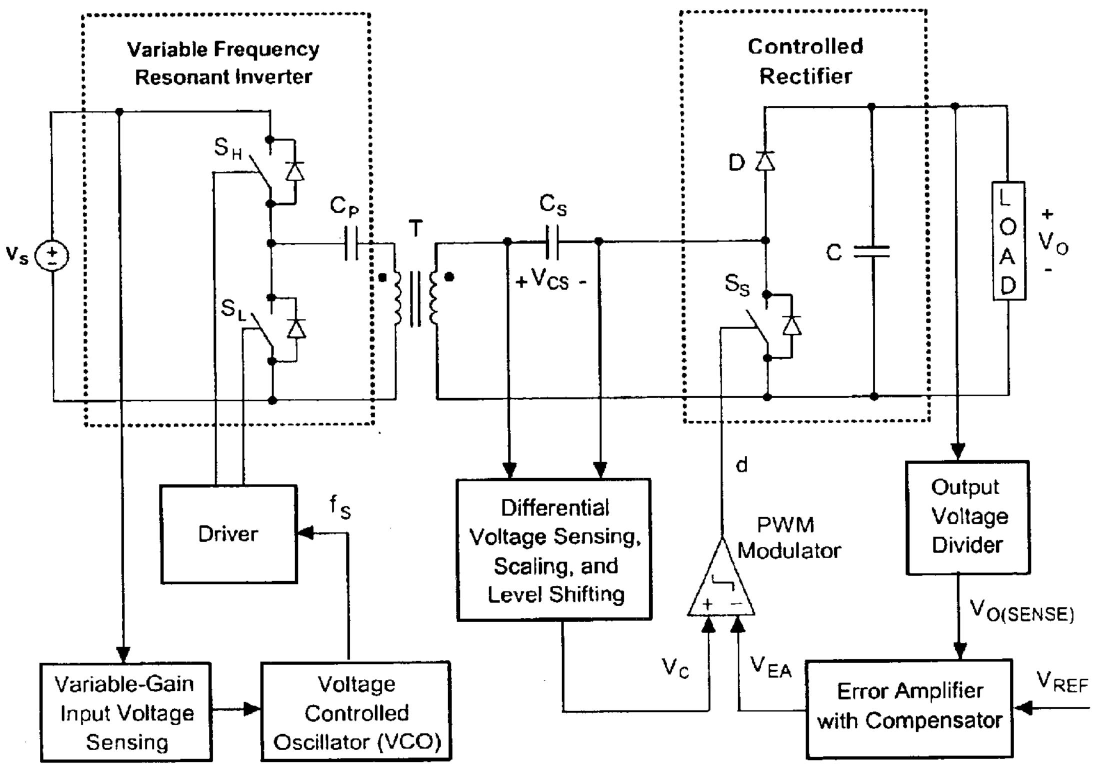
FIG. 2 shows a more detailed block diagram of the CEET system of FIG. 1.
Figure 3:
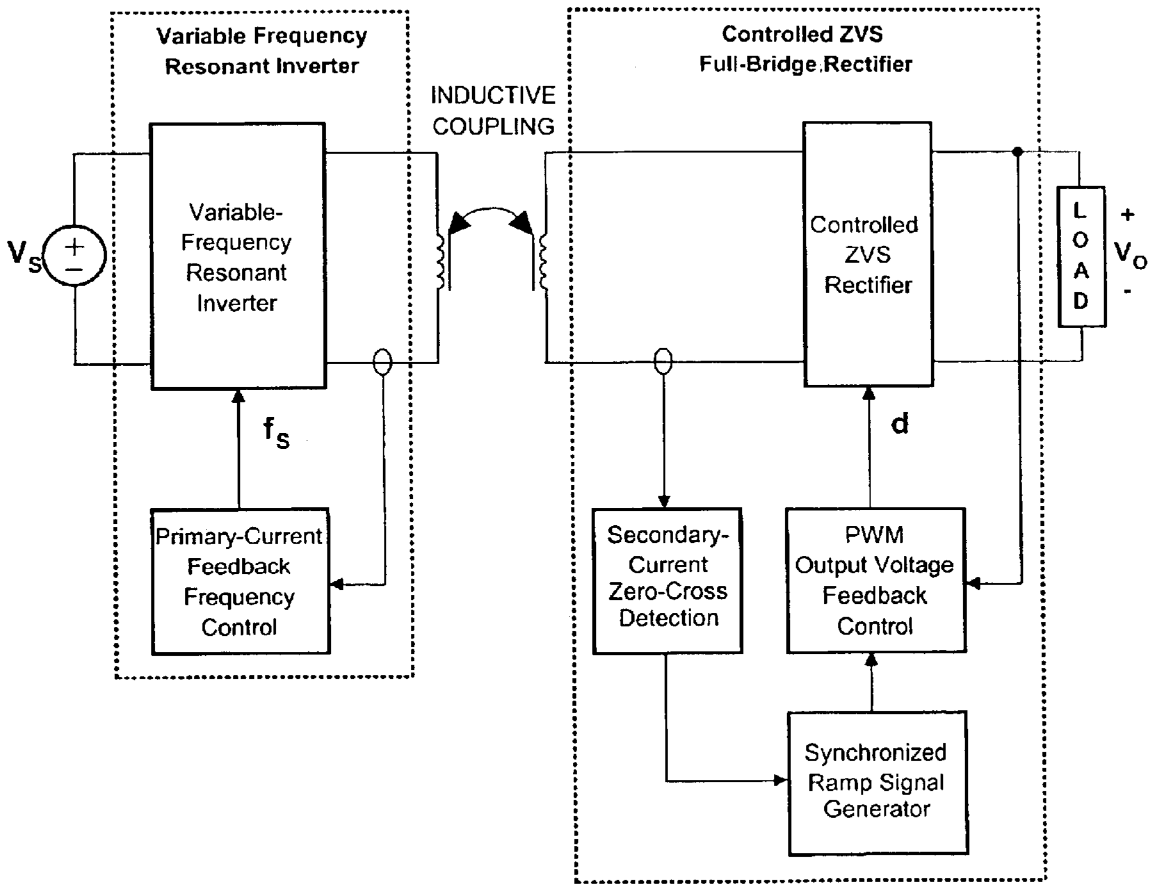
FIG. 3 shows a block diagram of a CEET system according to the present invention.

FIG. 3 shows an exemplary block diagram of the CEET system in accordance with the present invention. The system of FIG. 3 includes a variable frequency resonant inverter at a primary side and a controlled rectifier at a secondary side that includes a load. The primary side and secondary side are inductively coupled through the primary and secondary windings of a transformer. As shown, the inverter couples a power source having a power voltage $V_S$ to the primary winding through a primary resonant circuit comprising inductive and capacitive elements in the primary side. As described later in detail, a primary-current feed back frequency control block controls a primary switching frequency for regulating the power transfer between the primary and secondary sides. On the secondary side, the rectifier, which is a controlled zero-voltage switching (ZVS) rectifier, couples the secondary winding to a load through a secondary resonant circuit comprising inductive and capacitive elements in the secondary side. The primary resonant circuit and the secondary resonant circuit are inductively coupled each other through the primary and secondary windings of the transformer.

In accordance with one aspect of the present invention, current through the primary winding is controlled in response to a sensed current change that is caused by a power voltage $V_S$ or a load change. As such either one of a power voltage change or load change or both regulate the power transfer between the primary and secondary sides. More specifically, a primary controllable switching device has a switching frequency that controls the current flow through the primary winding. This aspect of the present invention senses primary resonant current changes for controlling the switching frequency of the primary controllable switching device so that the transferred power through the transformer is automatically maintained constant relative to power voltage $V_S$ and load changes. Also, as described later in detail, in accordance with another aspect of the present invention, a secondary current zero-cross detection block is used with a synchronized ramp signal generator to control a pulse width modulated (PWM) feedback control block that provides tightly regulated control over a wide range of load conditions.

Figure 4:
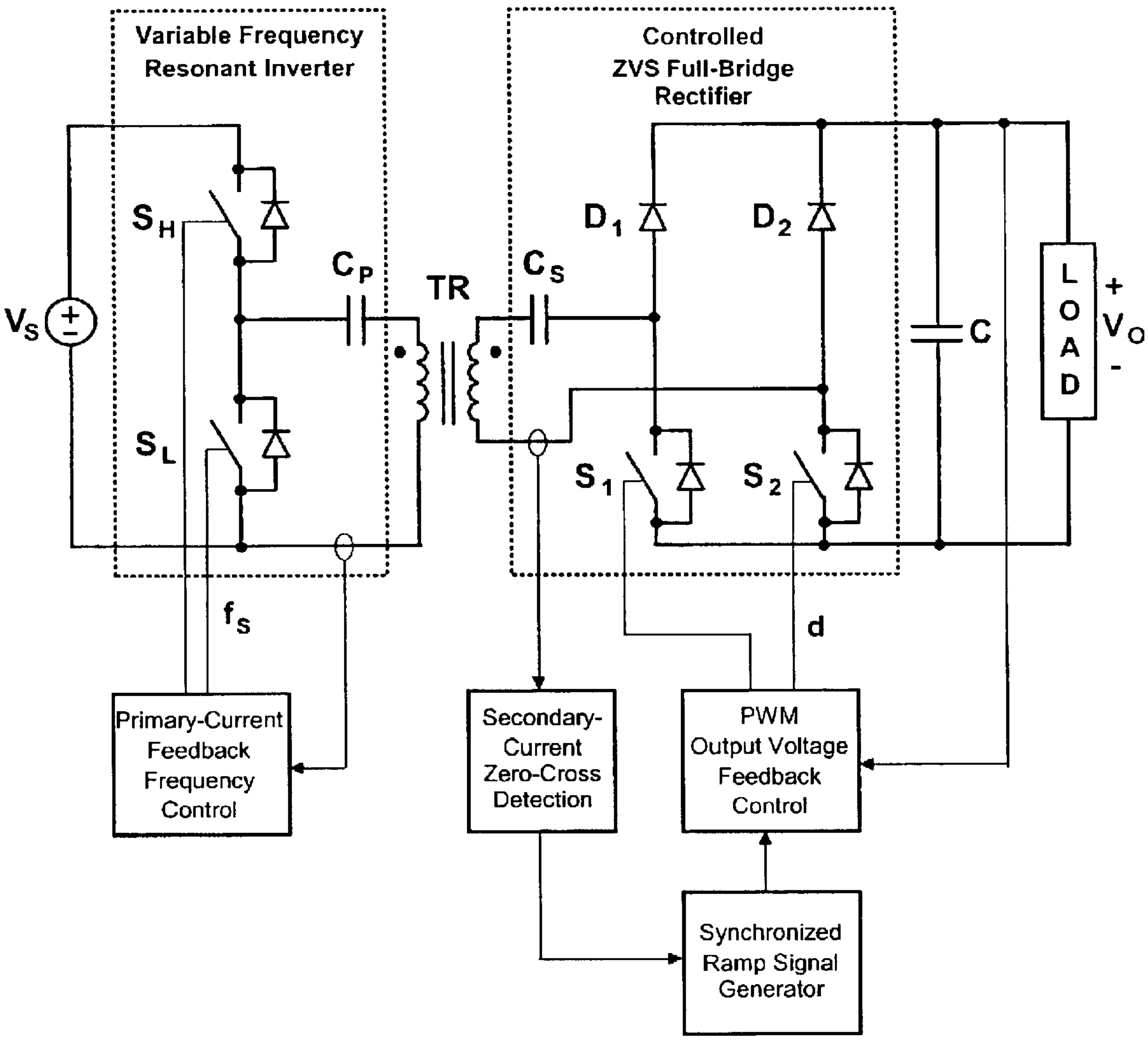
FIG. 4 shows a more detailed block diagram of the CEET system of FIG. 3.

FIG. 4 shows a more detailed block diagram of the CEET system of FIG. 3 with a series resonant inverter in the primary side. The primary side is comprised of a pair of primary switches $S_H$ and $S_L$, which are shown with their antiparallel diodes. These switches form a primary controlled switching circuit. The inverter also includes a resonant capacitor $C_P$, which is part of the primary resonant circuit. The secondary side is comprised of resonant capacitor $C_S$, diodes $D_{1\ and\ D2}$, and filter capacitor C. Secondary switches $S_1$ and $S_2$, which are also shown with their antiparallel diodes, form a secondary controlled switching circuit.

Figure 5:
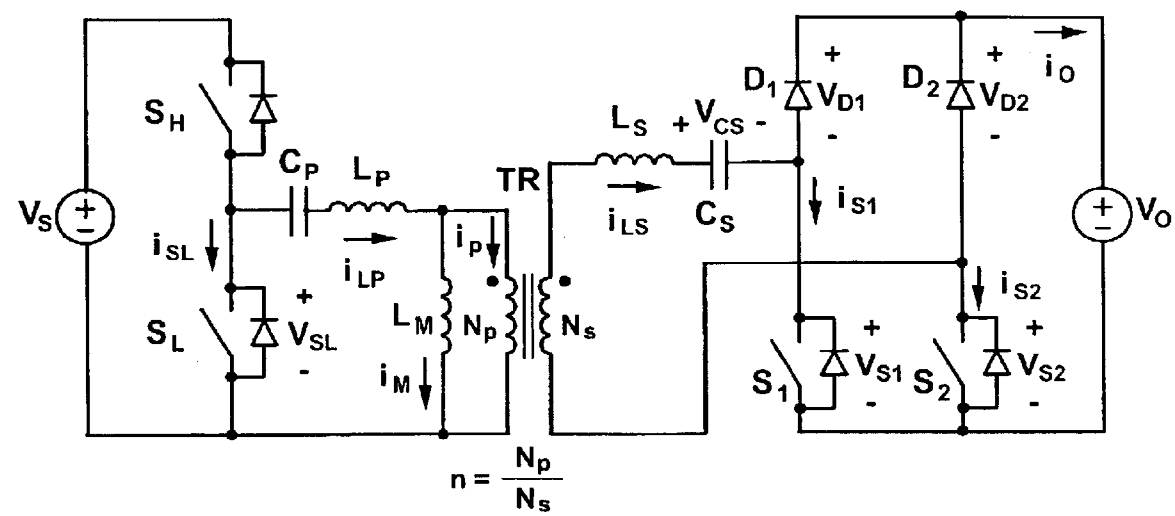
FIG. 5 shows an equivalent circuit diagram of the CEET system of the present invention.

FIG. 5 shows an equivalent circuit to the CEET system of the invention with leakage $L_P$, $L_S$, and magnetizing $L_M$ inductances of the transformer. To simplify the analysis, it is assumed that the input- and output-ripple voltages are negligible so that the voltages across the input and output filter capacitors can be represented by constant-voltage sources $V_S$ and $V_O$, respectively. As such, inductive and capacitive elements shown on the primary and secondary sides create respective primary and secondary resonant circuits that are inductively coupled to each other.

Figure 6:
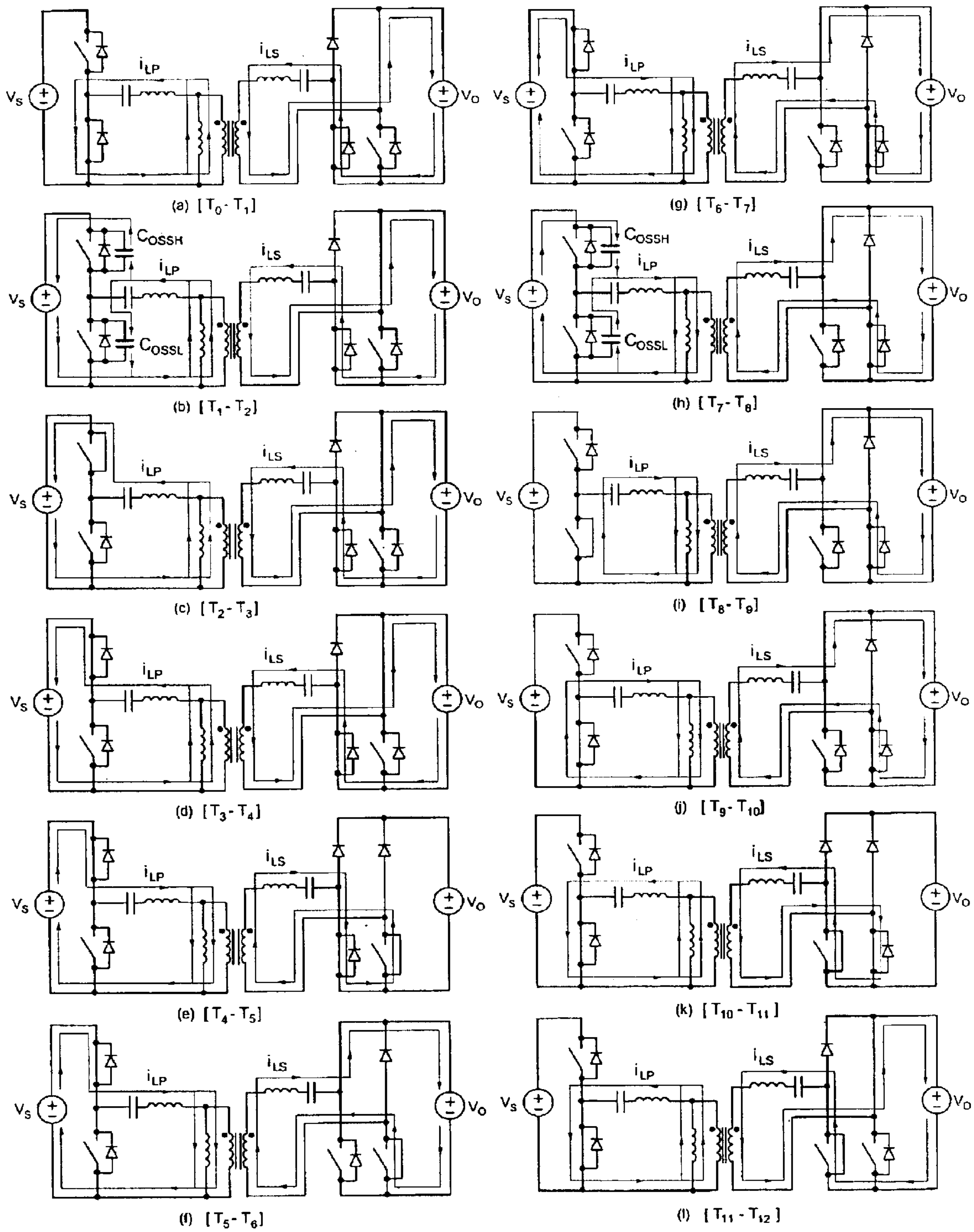
FIG. 6(*a*)–(*l*) show various topological stages for the equivalent circuit of FIG. 5.
Figure 7:
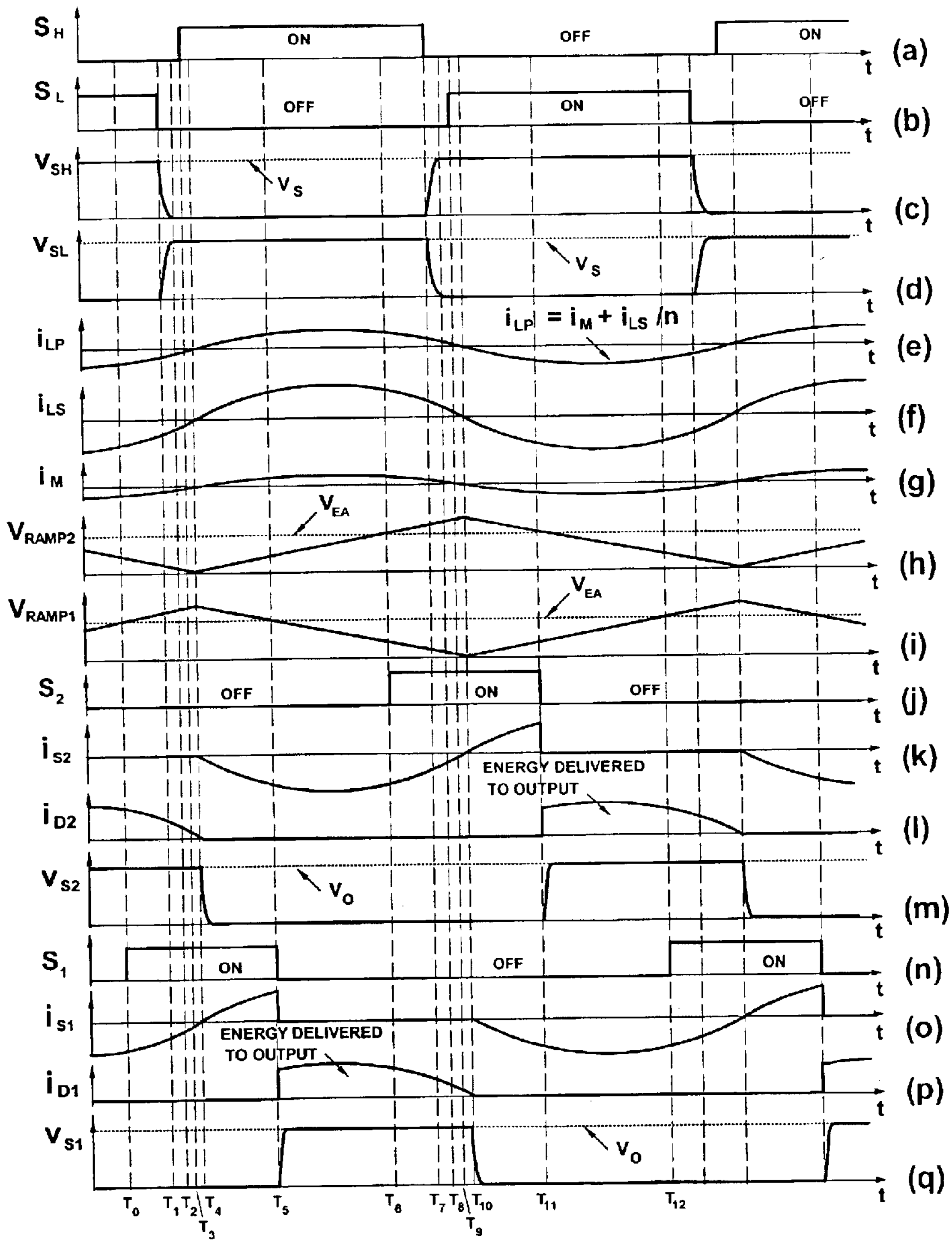
FIG. 7(*a*)–(*q*) show some of the waveforms for the equivalent circuit of FIG. 5.

To further facilitate the explanation of the operation, FIGS. 6(*a*)–(*l*) show topological stages of the circuit in FIG. 5 during a switching cycle, whereas FIGS. 7(*a*)(–(*q*) show the power-stage key waveforms for operation. To further simplify the analysis, the following analysis of operation assumes that all semiconductor components in the circuit are ideal. i.e., that they exhibit zero resistance when in the on state and infinite resistance in the off state. Moreover, the magnetizing current $i_M$ in FIG. 5 is in phase with resonant current $i_{LS}$. Nevertheless, these assumptions do not have any significant effect on the explanation of the principle of operation of the proposed circuit.

Before secondary switch $S_1$, is turned on at $t=T_0$, negative primary side resonant current $i_{LP}=i_M+i_P=i_M+i_{LS}/n$ flows through leakage inductance $L_P$, resonant capacitor $C_P$, and low-side switch $S_L$, whereas, negative secondary-side resonant current $i_{LS}$ flows through leakage inductance $L_S$, resonant capacitor $C_S$, output diode $D_2$, and the antiparallel diode of secondary switch $S_1$, as shown in FIG. 6(*l*). At the same time, output diode $D_1$ and secondary switch $S_2$ are off blocking output voltage $V_0$, whereas, high-side switch $S_H$ is off blocking input voltage $V_S$. As a result, secondary switch $S_1$ turns on with ZVS at $t=T_0$, as shown in FIG. 6(*a*).

After secondary switch $S_1$ is turned on, the direction of the resonant current is not changed until low-side switch $S_L$ is turned off at $t=T_1$. After low-side switch $S_L$ is turned off at $t=T_1$, resonant current $i_{LP}$ flowing through switch $S_L$ is diverted from the switch to its output capacitance $C_{OSSL}$, as shown in FIG. 6(*b*). As a result, the voltage across switch $S_L$ starts increasing, whereas the voltage across high-side switch $S_H$ starts decreasing, as illustrated in FIGS. 7(*c*) and 7(*d*), since the sum of the voltage across switches $S_L$ and $S_H$ is equal to input voltage $V_S$. When the voltage across high-side switch $S_H$ reaches zero at $t=T_2$, i.e., when output capacitance $C_{OSSH}$ of high-side switch $S_H$ fully discharged, the antiparallel diode of high-side switch $S_H$ begins to conduct, as shown in FIG. 6(*c*). At the same time, low-side switch $S_L$ is off blocking input voltage $V_S$. Because after $t=T_2$ input voltage $V_S$ is connected to the resonant circuit, the resonant current starts increasing. This topological stage ends at $t=T_4$ when $i_{LP}$ reaches zero and the antiparallel diode of high-side switch $S_H$ stops conducting. As can be seen from FIG. 7(*e*), to achieve ZVS of $S_H$, it is necessary to turn on $S_H$ while its antiparallel diode is conducting.

In FIG. 7(*a*), high-side switch $S_H$ is turned on at $t=T_3$ with ZVS. As a result, after $t=T_4$ resonant current $i_{LP}$ continues to flow through closed switch $S_H$, as shown in FIG. 6(*e*). Because of the assumption that currents $i_M$ and $i_{LS}$ are in phase with current $i_{LP}$, when the direction of current $i_{LP}$ is reversed at $t=T_4$, the direction of $i_M$ and $i_{LS}$ is also reversed, as illustrated in FIGS. 7(*e*)–7(*g*). Consequently, at $t=T_4$ current $i_{LS}$ which was flowing through output diode $D_2$ and the antiparallel diode of switch $S_1$, is diverted to the antiparallel diode of switch $S_2$ and switch $S_1$, as shown in FIG. 6(*e*). This topological stage ends at $t=T_5$, when secondary switch $S_1$ is turned off.

After secondary switch $S_1$ is turned off at $t=T_5$, primary side resonant current $i_{LP}$ flows through leakage inductance $L_P$, resonant capacitor $C_P$, and high-side switch $S_H$, whereas, secondary-side resonant current $i_{LS}$ flows through leakage inductance $L_S$, resonant capacitor $C_S$, output diode $D_1$, and the antiparallel diode of secondary switch $S_2$, as shown in FIG. 6(*f*). As a result, secondary switch $S_2$ can be turned on with ZVS at $t=T_6$, as shown in FIG. 6(*g*). This topological stage ends at $t=T_7$, when high-side switch $S_H$ is turned off. After high-side switch $S_H$ is turned off at $t=T_7$, resonant current $i_{LP}$ flowing through switch $S_H$ is diverted from the switch to its output capacitance $C_{OSSH}$, as shown in FIG. 6(*h*). As a result, output capacitance $C_{OSSH}$ is being charged, whereas output capacitance $C_{OSSL}$ is being discharged. When output capacitance $C_{OSSL}$ is fully discharged at $t=T_8$, the antiparallel diode of low-side switch $S_L$ begins to conduct, as shown in FIG. 6(*i*). At the same time, high-side switch $S_H$ is off blocking input voltage $V_S$. This topological stage ends at $t=T_{10}$ when $i_{LP}$ reaches zero and the antiparallel diode of low-side switch $S_L$ stops conducting. To achieve ZVS of $S_L$, it is necessary to turn on $S_L$ while its antiparallel diode is conducting. In FIG. 7, low-side switch $S_L$ is turned on at $t=T_9$ with ZVS. As a result, after $t=T_{10}$ resonant current $i_{LP}$ continues to flow through closed switch $S_L$, as shown in FIG. 6(*j*). As shown in FIGS. 6(*k*) and 7, after $t=T_{10}$, the direction of currents $i_{LP}$, $i_M$, and $i_{LS}$ are reversed so that current $i_{LP}$ flows through $S_L$, whereas, current $i_{LS}$ flows through switch $S_2$ and the antiparallel diode of switch $S_1$, as shown in FIG. 6(*k*). The circuit stays in this topological stage until the next switching cycle is initiated at $t=T_{12}$.

As can be seen, the voltage stress of switches $S_H$ and $S_L$ is always limited to input voltage $V_S$ while the voltage stress of $S_1$, $S_2$, $D_1$, and $D_2$ are always limited to the output voltage $V_O$.

Figure 8:
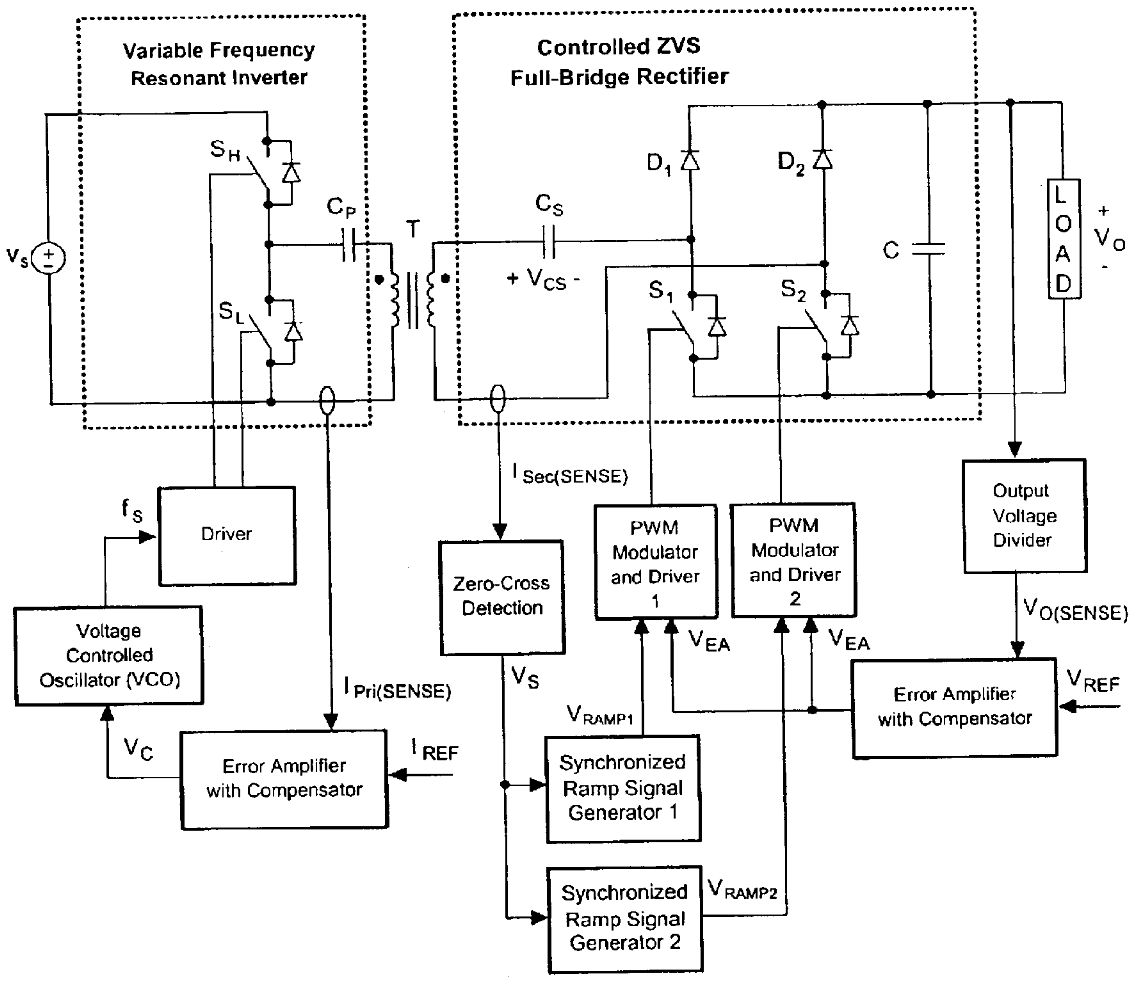
FIG. 8 shows a more detailed block diagram of the CEET system of FIG. 3.

FIG. 8 shows an exemplary implementation of the CEET system of the present invention. The primary side includes a primary control block that uses current feed back for frequency control. The primary control block comprises an error amplifier with compensator that receives a sensed primary current $I_{PR(SENSE)}$ and a reference current signal $I_{REF}$. Because of the primary and secondary resonant circuits are inductively coupled to each other, the sensed primary current $I_{PR(SENSE)}$ varies relative to the power voltage $V_S$ changes as well as load changes. Based on the inputted sensed primary current $I_{PR(SENSE)}$ and reference current signal $I_{REF}$, the error amplifier circuit generates an error signal $V_C$, which is applied to a voltage controlled oscillator (VCO). The VCO output sets the primary switching frequency $f_s$ used to control the primary controlled switching circuit, which includes primary switches $S_H$ and $S_L$. A driver controls the switching states of the primary switches $S_H$ and $S_L$ by turning them on and off in accordance with the primary switching frequency $f_S$.

Because the primary switching frequency $f_S$ controls the current flow through the primary winding, the disclosed arrangement maintains a constant energy transfer between the primary and secondary sides over the entire range of power voltage $V_S$ and load variations. Consequently, the CEET system of the invention provides a tight regulation of delivered power over the entire load and power source voltage ranges without a physical feedback connection between the primary side and secondary side. As sated above, the primary switching frequency $f_S$ is controlled to keep the magnitude of the primary current constant, so that the maximum transferable power through the inductive coupling is automatically kept constant without an excessive circulating energy.

Preferably, the range of the primary switching frequency $f_S$ is set to be higher than the primary resonant frequency to provide a Zero Voltage Switching (ZVS) arrangement for the primary switches $S_H$ and $S_L$, thereby avoiding hard switching conditions. Alternatively, the primary switching frequency $f_S$ can be set to be lower than the primary resonant frequency primary to operate the primary switches $S_H$ and $S_L$ with a zero current switching (ZCS) arrangement.

In accordance with another aspect of the present invention, the CEET system provides the output voltage feedback controller with a constant PWM gain over the entire load range using synchronized ramp signals. The diodes $D_1$ *and D2*, which form the secondary rectifier, are controlled by a secondary control block. The secondary control block uses a ZVS PWM control to maintain a tight regulation of the output voltage in the presence of a varying load. The secondary control block includes two PWM modulators that are responsive to the output voltage variations and the synchronized ramp signals for controlling the secondary switches $S_1$ and $S_2$ during various load conditions including light load and high load conditions. Under this Arrangement, a sensed output voltage $V_{O(SENSE)}$ is compared with a reference voltage $V_{REF}$ at the input of an error with compensation amplifier. A generated error signal $V_{EA}$ at the output of the error amplifier is compared with ramp signals $V_{RAMP1}$ and $V_{RAMP2}$. Ramp signals $V_{RAMP1}$ and $V_{RAMP2}$ are synchronized to the zero crossing of the secondary resonant current and 180° out of phase each other as shown in FIGS. 7(*h*) and 7(*i*). By the comparisons between error signal $V_{EA}$ and ramp signals $V_{RAMP1}$, and $V_{RAMP2}$, gate signals $S_1$ and $S_2$ are generated as shown in FIGS. 7(*j*) and 7(*n*).

According to another aspect of the present invention, the gate signals are generated such that the secondary switches S1 and S2 turn on when their antiparallel diodes are conducting. As a result, the CEET system of the present invention not only provides ZVS for the primary switches $S_H$ and $S_L$ but also for the secondary switches $S_1$ and $S_2$.

When $S_1$ and $S_2$ are shorted, i.e., turned on, the load is separated from the secondary resonant circuit, causing less damped resonance and thereby increasing the secondary resonant current. This is because the secondary resonant current does not go through the load and is bypassed through the $S_1$ and $S_2$ causing a short circuit with no damping that results in the secondary resonant current to increase. Because of the inductive coupling provided by the primary and secondary windings, the increased current is sensed at the primary side. Based on the increased sensed current, the primary control block Increases the switching frequency to maintain constant current through the primary winding.

In case of above resonant frequency operation, when the switching frequency is reduced, higher current and thus more energy is delivered to the load. Conversely, when the switching frequency is increased, lower current and thus less energy is delivered to the load. This can happen when $S_1$ and $S_2$ are opened, i.e., turned off. As a result, the load is connected in series to the secondary resonant circuit increasing resonance damping, which reduces secondary resonant current flow. As a result, sensed resonant current at the primary side is reduced, thereby reducing the primary switching frequency to maintain constant current through the primary winding. It should be noted that $S_1$ and $S_2$ operate at the same frequency as the primary side switches $S_L$ and $S_H$.

In an exemplary implementation, the performance of the CEET system of the invention was evaluated on a 36-W (12 V/3 A), universal-line-range (90–265 $V_{AC}$) prototype circuit operating over a switching frequency range from 125 kHz to 328 kHz. The experimental circuit was implemented with the following components: switches $S_H$ and $S_L$—IRF840; secondary switch $S_1$ and $S_2$—SI4810DY; and output diode $D_1$ and $D_2$=MBR2045CT. Inductive coupling transformer T was built using a pair of modified ferrite cores (EER28-3F3) with the primary winding (80 turns of AWG#44/75 strands Litz wire) and the secondary winding (18 turns of AWG#42/150 strands Litz wire). The control circuit was implemented with controllers UC3863, LM319, AD817, and LM393. A TL431 voltage-reference ICs is used for an output voltage reference for the locally controlled rectifier. An IR2110 driver is used to generate the required gate-drive signals for switches $S_H$ and $S_L$. Two TC4420 drivers are used to generate the required gate-drive signals for switches $S_1$ and $S_2$. The output voltage of the experimental circuit is well regulated with a voltage ripple less than 2% over the entire input-voltage range. The measured efficiencies are approximately 84.4% at full load and minimum input voltage and approximately 78.5% at full load and maximum input voltage.

What is claimed is:

1. A contactless electrical energy transmission system for coupling a power source to a load, comprising:
- a transformer having a primary winding and a secondary winding;
- an inverter coupling said power source to said primary winding through a primary resonant circuit;
- a primary controllable switching device responsive to a switching frequency that controls the flow of current through said primary winding;
- a rectifier coupling said secondary winding to said load through a secondary resonant circuit that is inductively coupled to the primary resonant circuit; and
- a primary control circuit responsive to a current change through said primary resonant circuit to control the switching frequency for maintaining a substantially constant energy transfer between the primary winding and secondary winding in response to at least one of a power source voltage change and a load change.

2. The system of claim 1 further including a secondary controllable switching device that is responsive to a load change for controlling the amount of energy delivered to the load.

3. The system of claim 2, wherein the secondary controllable switching device is responsive to at least one pulse width modulated control signal for controlling the amount of energy delivered to the load.

4. The system of claim 3, wherein a secondary control circuit generates the at least one pulse width modulated control signal in response to at least one of a voltage variation across the load and a zero current crossing detection through said secondary resonant circuit.

5. The system of claim 4, wherein the secondary controllable switching device includes at least one switch responsive to the pulse width modulated control signal, wherein the switch is activated at a substantially zero voltage.

6. The system of claim 5, wherein the secondary control circuit detects a zero current crossing through said secondary resonant circuit to generate synchronized ramp signals for controlling the at least one pulse width modulated control signal.

7. The system of claim 6, wherein the synchronized ramp signals are 180° out of phase with respect to each other.

8. A contactless electrical energy transmission system for coupling a power source to a load, comprising:
- a transformer having a primary winding and a secondary winding;
- an inverter coupling said power source to said primary winding through a primary resonant circuit;
- a primary controllable switching device responsive to a switching frequency that controls flow of current through said primary winding;
- a secondary rectifier coupling said secondary winding to said load through a secondary resonant circuit that is inductively coupled to the primary resonant circuit; and
- a secondary control circuit that generates at least one pulse width modulated control signal for controlling the amount of energy delivered to the load, wherein the at least one pulse width modulated signal is generated in response to a voltage variation across the load and a zero current crossing through said secondary resonant circuit.

9. The system of claim 8 further including a primary control circuit responsive to a current change through said primary resonant circuit to control the switching frequency of said primary controllable switching device for maintaining a substantially constant energy transfer between the primary winding and secondary winding in response to at least one of a power source voltage change and a load change.

10. The system of claim 8 further including a secondary controllable switching circuit that is responsive to the at least one pulse width modulated control signal for delivering energy to the load.

11. The system of claim 10, wherein the secondary controllable switching device includes at least one switch responsive to the pulse width modulated control signal, wherein the switch is activated at a substantially zero voltage.

12. The system of claim 8, wherein the secondary control circuit detects a zero current crossing through said secondary resonant circuit to generate synchronized ramp signals for controlling the at least one pulse width modulated control signal.

13. The system of claim 12, wherein the synchronized ramp signals are 180° out of phase with respect to each other.

14. A contactless electrical energy transmission system for coupling a power source to a load, comprising:
- a transformer having a primary winding and a secondary winding;
- an inverter coupling said power source to said primary winding through a primary resonant circuit;
- a primary controllable switching device having a switching frequency that controls flow of current through said primary winding;
- a rectifier coupling said secondary winding of said transformer to said load through a secondary resonant circuit that is inductively coupled to the primary resonant circuit; and
- a secondary controllable switching circuit responsive to at least one pulse width modulated control signal having at least one switching element that is switched at substantially zero voltage.

15. The system of claim 14 further including a primary control circuit responsive to current changes through said primary resonant circuit to control the switching frequency of said controllable switching device for maintaining a substantially constant energy transfer between the primary winding and secondary winding in response to at least one of a power source voltage change and a load change.

16. The system of claim 14 further including a secondary control circuit that generates the at least one pulse width modulated control signal in response to least one of a voltage variation across the load and a zero current crossing detection through said secondary resonant circuit.

17. The system of claim 14, wherein the secondary controllable switching device includes at least one switch for generating the pulse width modulated control signal, wherein the switch is activated at a substantially zero voltage.

18. The system of claim 16, wherein the secondary control circuit detects a zero current crossing through said secondary resonant circuit to generate synchronized ramp signals for controlling the at least one pulse width modulated control signal.

19. The system of claim 18, wherein the synchronized ramp signals are 180° out of phase with respect to each other.

* * * * *